US011896862B2

(12) United States Patent
Dauman

(10) Patent No.: US 11,896,862 B2
(45) Date of Patent: Feb. 13, 2024

(54) EMERGENCY EGRESS TRAINING SYSTEM AND METHOD

(71) Applicant: Long Island Egress Pros Inc., West Babylon, NY (US)

(72) Inventor: Glen Dauman, Old Bethpage, NY (US)

(*) Notice: Subject to any disclaimer, the term of this patent is extended or adjusted under 35 U.S.C. 154(b) by 1023 days.

(21) Appl. No.: 16/803,868

(22) Filed: Feb. 27, 2020

(65) Prior Publication Data

US 2021/0086011 A1 Mar. 25, 2021

Related U.S. Application Data

(60) Provisional application No. 62/905,774, filed on Sep. 25, 2019.

(51) Int. Cl.
 *A62C 99/00* (2010.01)
 *G09B 19/00* (2006.01)
 *E04F 17/06* (2006.01)
 *A62B 5/00* (2006.01)

(52) U.S. Cl.
 CPC .......... *A62C 99/0081* (2013.01); *E04F 17/06* (2013.01); *G09B 19/00* (2013.01); *A62B 5/00* (2013.01)

(58) Field of Classification Search
 None
 See application file for complete search history.

(56) References Cited

U.S. PATENT DOCUMENTS

| | | | | | |
|---|---|---|---|---|---|
| 5,173,052 A | * | 12/1992 | Duncan, Jr. | ............ | G09B 19/00 296/168 |
| 5,203,707 A | * | 4/1993 | Musto | .................... | G09B 19/00 434/226 |
| 5,255,758 A | | 10/1993 | Hood, Jr. | | |
| 5,275,571 A | * | 1/1994 | Musto | .................... | G09B 19/00 434/226 |
| 5,752,835 A | * | 5/1998 | Whitmer, Sr. | ........... | G09B 9/00 434/226 |

(Continued)

FOREIGN PATENT DOCUMENTS

EP 3467252 A1 4/2019

OTHER PUBLICATIONS

City of Loveland; Loveland Fire & Rescue Training Facility Brochure; http://www.cityofloveland.org/Home/ShowDocument?id=8579; p. 1-10; Nov. 9, 2021; Loveland, CO.

(Continued)

*Primary Examiner* — James B Hull
(74) *Attorney, Agent, or Firm* — Wolter Van Dyke Davis, PLLC; Robert L. Wolter

(57) ABSTRACT

A system is provided for emergency egress training. The system includes a training building including a first story simulating a basement of a second building and a second story simulating a first story of the second building. The system further includes a platform defining an opening and including a base configured to mount the platform on a ground surface. The system also includes an egress well operatively connected to the platform at the opening such that a base of the egress well is positioned above the ground surface and wherein the egress well is further operatively connected to the first story of the training building. An emergency egress training method is also provided.

21 Claims, 13 Drawing Sheets

(56) References Cited

U.S. PATENT DOCUMENTS

| | | | | |
|---|---|---|---|---|
| 6,799,975 | B1* | 10/2004 | Dunn | G09B 19/00 |
| | | | | 434/226 |
| 6,929,094 | B1 | 8/2005 | Kohlmeier et al. | |
| 7,008,230 | B2* | 3/2006 | Hoglund | G09B 19/00 |
| | | | | 434/236 |
| D777,947 | S | 1/2017 | Simmons et al. | |
| 9,940,850 | B1* | 4/2018 | Oliva | G09B 19/00 |
| 10,923,000 | B2* | 2/2021 | Di Donato | G09B 25/02 |
| 11,276,323 | B1* | 3/2022 | Kirchner | G09B 9/00 |
| 2008/0090214 | A1 | 4/2008 | D'Anneo | |
| 2018/0179752 | A1 | 6/2018 | Song | |

OTHER PUBLICATIONS

Fire Facilities Steel Fire Training Towers; The Division Chief brochure; https://www.firefacilities.com/fire-training-towers/tower-models/the-division-chief/; p. 1-2; Nov. 9, 2021; Sun Prairie, WI.

Fire Facilities Steel Fire Training Towers; The Captain brochure; https://www.firefacilities.com/fire-training-towers/tower-models/the-captain/; p. 1-2; Nov. 9, 2021; Sun Prairie, WI.

Chatham Home Design—Pinterest Blog; https://www.pinterest.com/pin/535224736944116413/; p. 1; Nov. 9, 2021.

Mathewson, Glenn; Providing for Emergency Egress; The Journal of Light Construction online article; https://www.deckmagazine.com/design-construction/dont-block-emergency-egress-with-a-deck_o; Nov. 1, 2008; p. 1-2; Washington, DC.

Butler, Brian D.; Basement Fires Part 2; Fire Engineering online article; https://community.fireengineering.com/profiles/blog/show?id=1219672%3ABlogPost%3A644874#gref; p. 1-10; Mar. 31, 2018; New Rochelle, NJ.

City of Loveland; Loveland Fire & Rescue Training Facility Brochure; http://www.cityofloveland.org/Home/ShowDocument?id=8579; p. 1-10; date of retrieval Nov. 9, 2021; Loveland, CO.

Fire Facilities Steel Fire Training Towers; The Division Chief brochure; https://www.firefacilities.com/fire-training-towers/tower-models/the-division-chief/; p. 1-2; date of retrieval Nov. 9, 2021; Sun Prairie, WI.

Fire Facilities Steel Fire Training Towers; The Captain brochure; https://www.firefacilities.com/fire-training-towers/tower-models/the-captain/; p. 1-2; date of retrieval Nov. 9, 2021; Sun Prairie, WI.

Chatham Home Design—Pinterest Blog; https://www.pinterest.com/pin/535224736944116413/; p. 1; date of retrieval Nov. 9, 2021.

Mathewson, Glenn; Providing for Emergency Egress; The Journal of Light Construction online article; https://www.deckmagazine.com/design-construction/dont-block-emergency-egress-with-a-deck_o; date of retrieval Nov. 9, 2021; p. 1-2; Washington, DC.

Butler, Brian D.; Basement Fires Part 2; Fire Engineering online article; https://community.fireengineering.com/profiles/blog/show?id=1219672%3ABlogPost%3A644874#gref; p. 1-10; date of retrieval Nov. 9, 2021; New Rochelle, NJ.

* cited by examiner

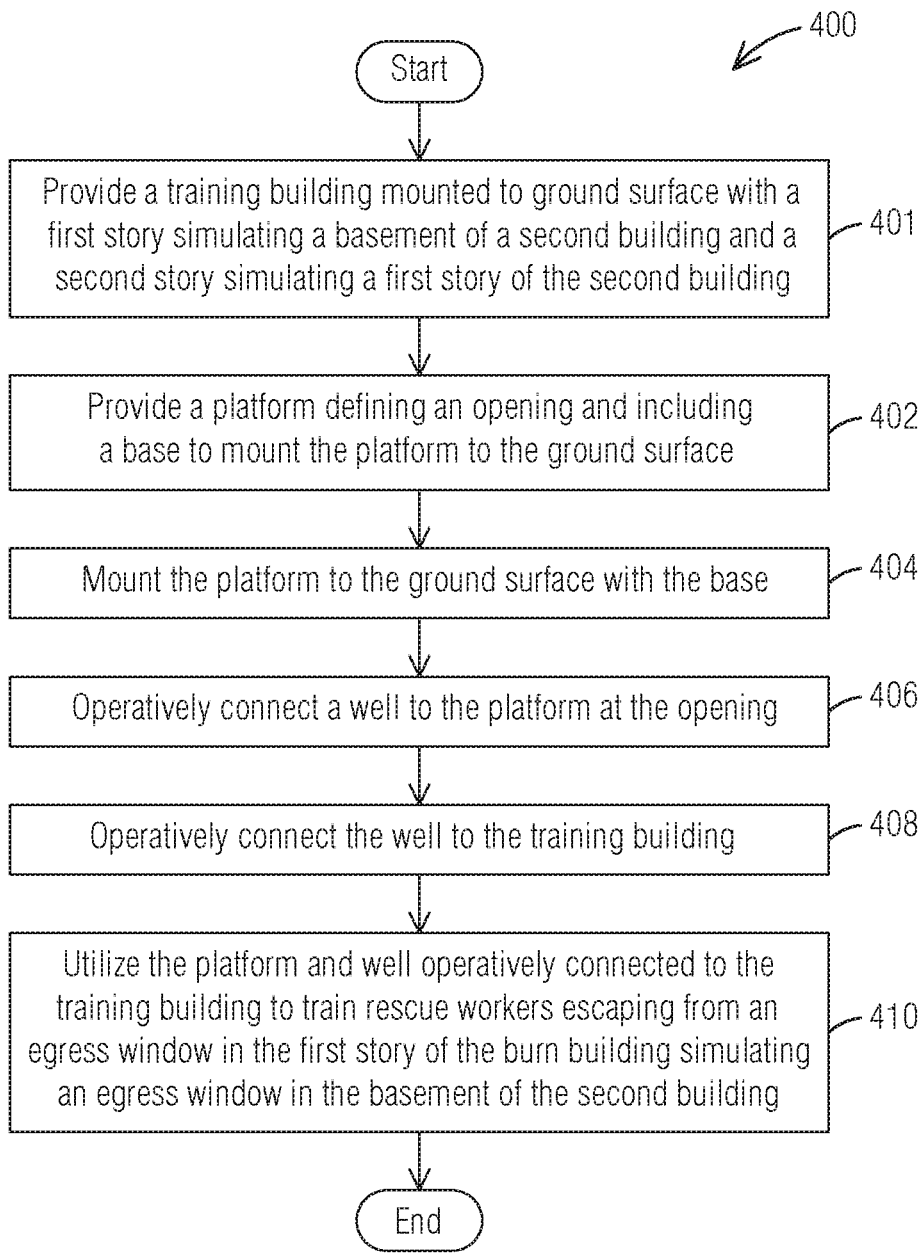

EMERGENCY EGRESS TRAINING SYSTEM AND METHOD

CROSS REFERENCE TO RELATED APPLICATIONS

This application claims benefit of Provisional Application No. 62/905,774, filed Sep. 25, 2019, the entire contents of which is hereby incorporated by reference as if fully set forth herein, under 35 U.S.C. § 119(e).

BACKGROUND

Conventional fire training systems and methods are available. For example, such conventional fire training systems and methods involve the use of a burn building, for training emergency personnel, such as firefighters. In one example, U.S. Patent Publication Number 2008/0090214A1 ("'214 application") discloses a burn building for training firefighters which features a burn room with a heat generation unit, to generate realistic working conditions in a controlled manner (e.g. controlled temperature and smoke conditions).

BRIEF DESCRIPTION OF THE DRAWINGS

Embodiments are illustrated by way of example, and not by way of limitation, in the figures of the accompanying drawings in which like reference numerals refer to similar elements and in which:

FIG. 4 is a flow chart that illustrates an example of an emergency egress training method, according to an embodiment.

DETAILED DESCRIPTION

Although conventional fire training systems and methods are available for training firefighters, such conventional systems and methods are limited to the extent that they can generate realistic working conditions. The inventor of the present invention recognized that conventional fire training systems and methods are available for training emergency personnel (e.g. firefighters) by generating some realistic working conditions (e.g. temperature and smoke conditions in the '214 application). However, the inventor of the present invention recognized that conventional fire training systems and methods are not available for training emergency personnel by generating other realistic working conditions, such as those conditions involved in rescuing people from a training building with an egress window well. Additionally, the inventor recognized that conventional fire training systems and methods are not available which provide an emergency egress training system and method that can be used in any type of building for training purposes (e.g. burn building, non-burn building, mobile building, permanent building, etc.). Thus, the inventor developed the invention described herein to provide an emergency egress training system and method that can be used to train emergency personnel (e.g. firefighters, police, first responders, etc) in rescuing people from a building with an egress window well and/or that can be used with any type of building for training purposes (e.g. burn building, non-burn building, mobile building, permanent building, etc.)

Figure 1:
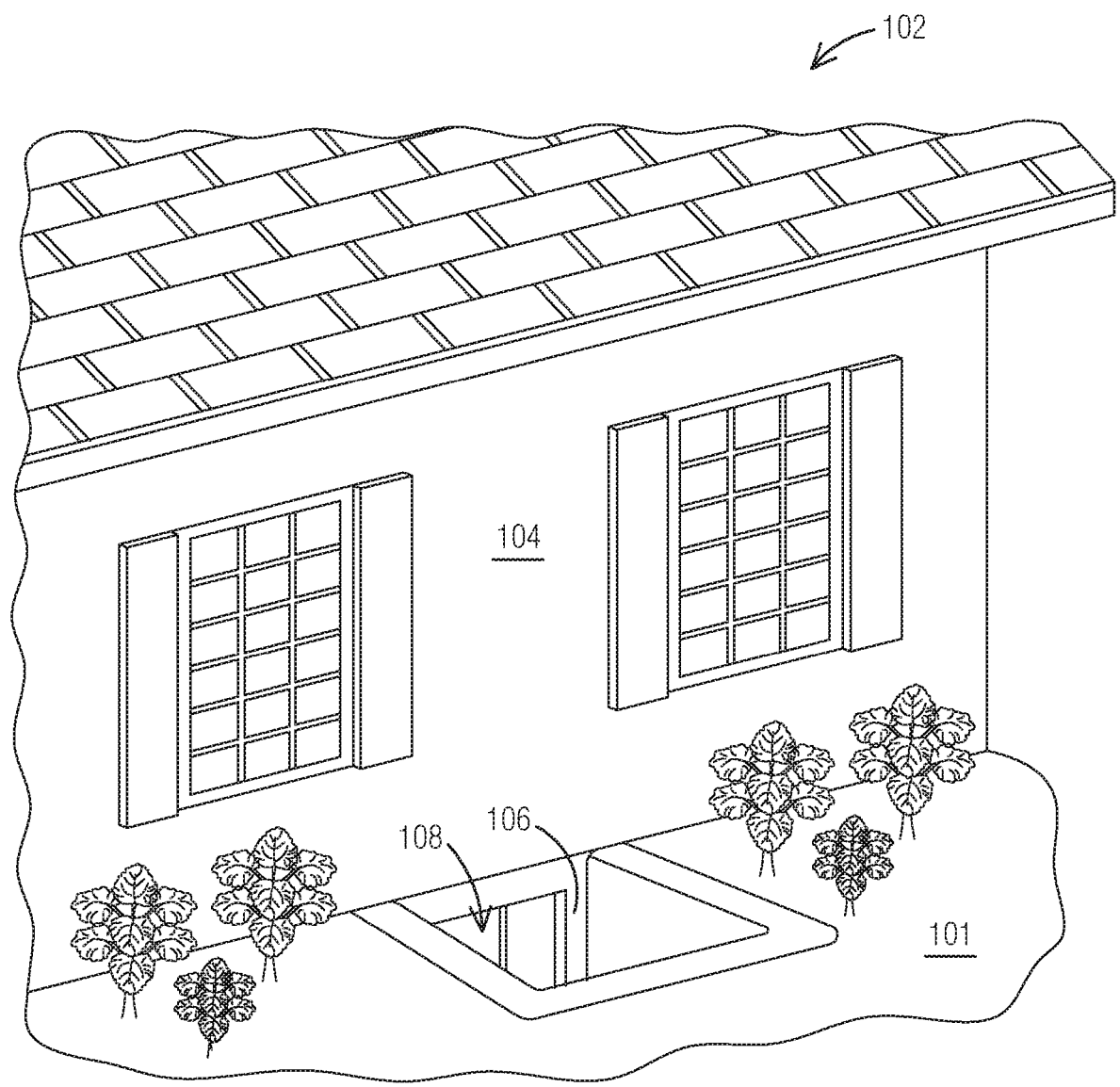
FIG. 1 is an image that illustrates an example of a side perspective view of a conventional building with a first story and a basement with an egress window well.

FIG. 1 is an image that illustrates an example of a side perspective view of a conventional building 102 (e.g. residence) with a first story 104 and a basement 106 with an egress window well 108. As appreciated by one of ordinary skill in the art, the egress window well 108 is provided as an emergency egress for people trapped in the basement 106, in the event that building exits in the first story 104 are not accessible during a fire or other emergency event. Firefighters who enter the building 102 to rescue people trapped in the basement 106 routinely assist people leaving the building 102 by helping them exit through a window into the egress window well 108 and further assist them out of the egress window well 108 onto the ground surface 101 (e.g.

either by physically assisting them or by positioning a ladder along an inside surface of the egress window well 108). Additionally after entering the building 102 to evacuate a fire, the firefighters routinely exit the building 102 through the egress window well 108 and either lift themselves out of the egress window well 108 onto the ground surface 101 or climb out of the egress window well 108 using a ladder mounted to an inside surface of the egress window well 108. Thus, the inventor of the present invention recognized that it would be advantageous to provide an emergency egress training system and method that replicates the working conditions of the egress window well 108 of a conventional building 102, so that emergency personnel (e.g. firefighters) can engage in training exercises in preparation for these scenarios.

For purposes of this description, "ground surface" is defined to mean a surface of the Earth on which a building is mounted, so that the first story of the building is above the ground surface and the basement of the building is below the ground surface. For purposes of this description, "training building" is defined to mean a building that is designed with one or more features for training emergency personnel (e.g. firefighters) such that the one or more design features replicate one or more working conditions encountered by the emergency personnel and/or does not encompass buildings utilized as a residence or to transact business. In some embodiments, "training building" includes a burn building (e.g. with one or more properties to emulate a fire condition such as flames, heat, smoke and/or built from material such as concrete, aluminum or any material appreciated by one of ordinary skill in the art) and/or a non-burn building (e.g. not built with properties to emulate fire condition and/or built from material such as wood or any material appreciated by one of ordinary skill in the art) and/or a temporary building other than a burn building or non-burn building and/or a permanent building other than a burn building, non-burn building or a temporary building. For purposes of this description, "egress well" is defined to mean a structure that is positioned adjacent an opening (e.g. window) of a building and/or operatively connected to the building so to define an egress cavity for an individual to exit the building through the opening. For purposes of this description, the systems and method herein are designed to provide emergency egress training, where "emergency egress" means a situation where one or more inhabitants of a building need to be rescued from a basement of a building through an egress window well due one or more emergency conditions (e.g. fire, medical condition, gas leak, flood, etc.) within the building and/or where one or more emergency personnel need to enter/exit the building through the egress window well to provide emergency services (e.g. put out fire, rescue inhabitants within the building, provide medical treatment to inhabitants, etc).

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of fire training. In other embodiments, the invention is described below in the context of providing a system and method for training emergency personnel (e.g. firefighters) that replicates one or more conditions encountered by emergency personnel in the field. In still other embodiments, the invention is described below in the context of fire training where a training building (e.g. burn building, non-burn building, temporary building, permanent building, etc.) is employed, where the training building simulates one or more floors of a real building, e.g. where the real building includes a basement with an egress window well.

Figure 2A:
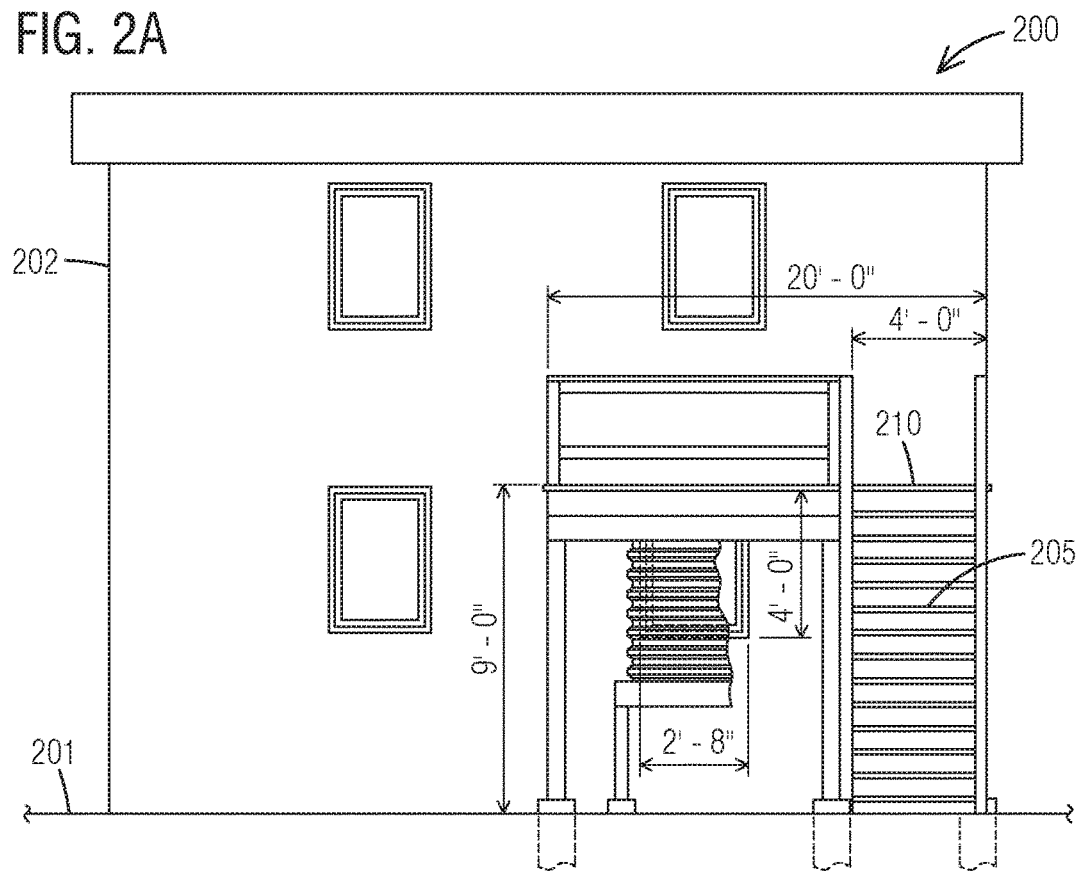
FIG. 2A is a schematic drawing that illustrates an example of a partial sectional front view of a system for emergency egress training, according to an embodiment.
Figure 2B:
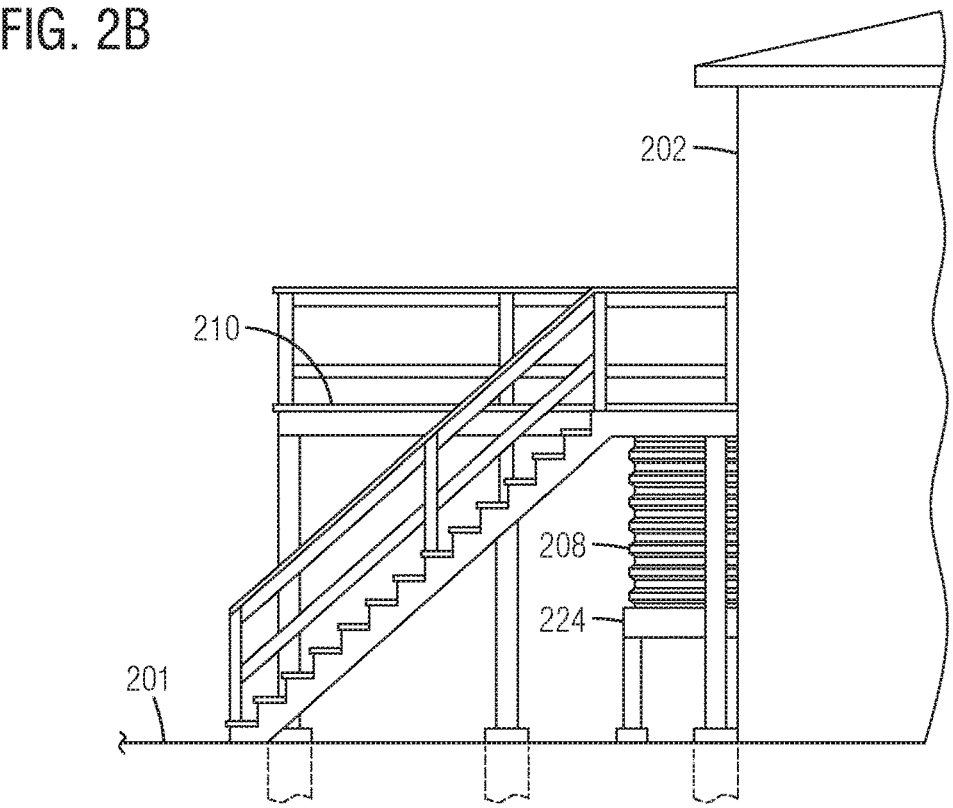
FIG. 2B is a schematic drawing that illustrates an example of a side view of the system for emergency egress training of FIG. 2A, according to an embodiment.
Figure 2C:
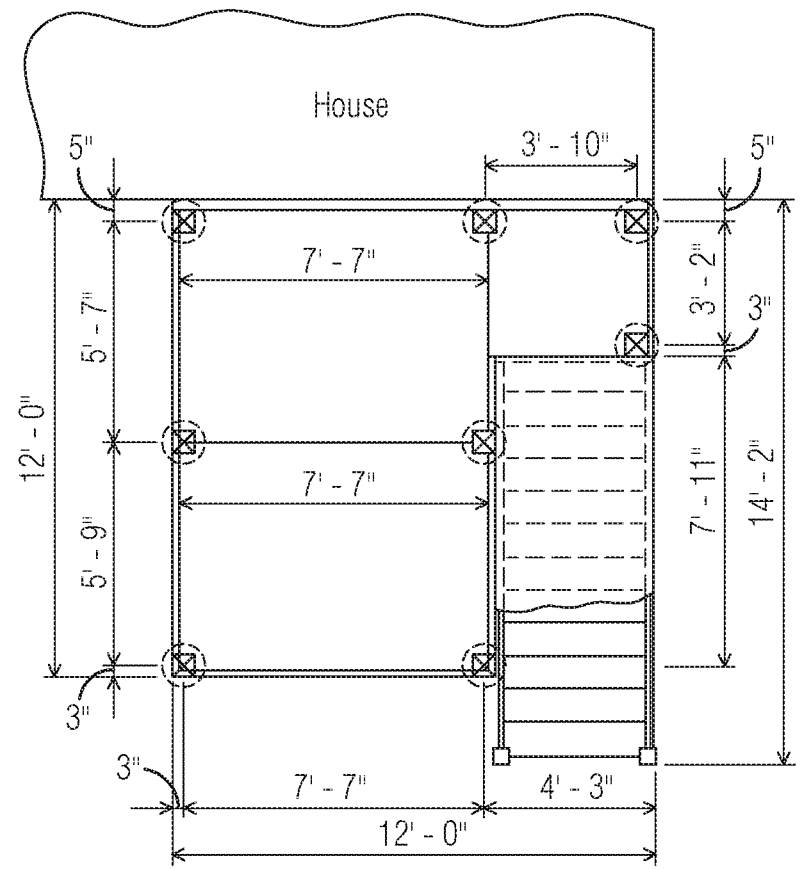
FIG. 2C is a schematic drawing that illustrates an example of a top view of the platform of the system of FIG. 2A, according to an embodiment.
Figure 2D:
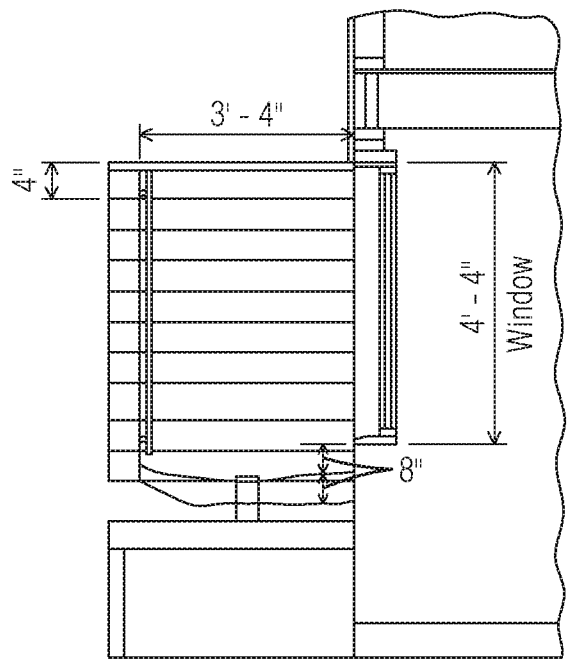
FIG. 2D is a schematic drawing that illustrates an example of a top view of the system of FIG. 2A, according to an embodiment.

FIGS. 3A-3D are images that illustrate an example of front and side views of a system 200 for emergency egress training, according to an embodiment. FIGS. 2A-2D are schematic drawings that illustrate an example of front, side and top views of the system 200 for emergency egress training, according to an embodiment. Although FIGS. 2C-2D depict numerical dimensions for one or more components of the system 200, these dimensions are just one example of a dimension for the depicted component and in other embodiments the component can have dimensions that vary from these numerical dimensions. In an example embodiment, the training building 202 is a building used for laddering and/or PACK training (e.g. air tanks).

Figure 3A:
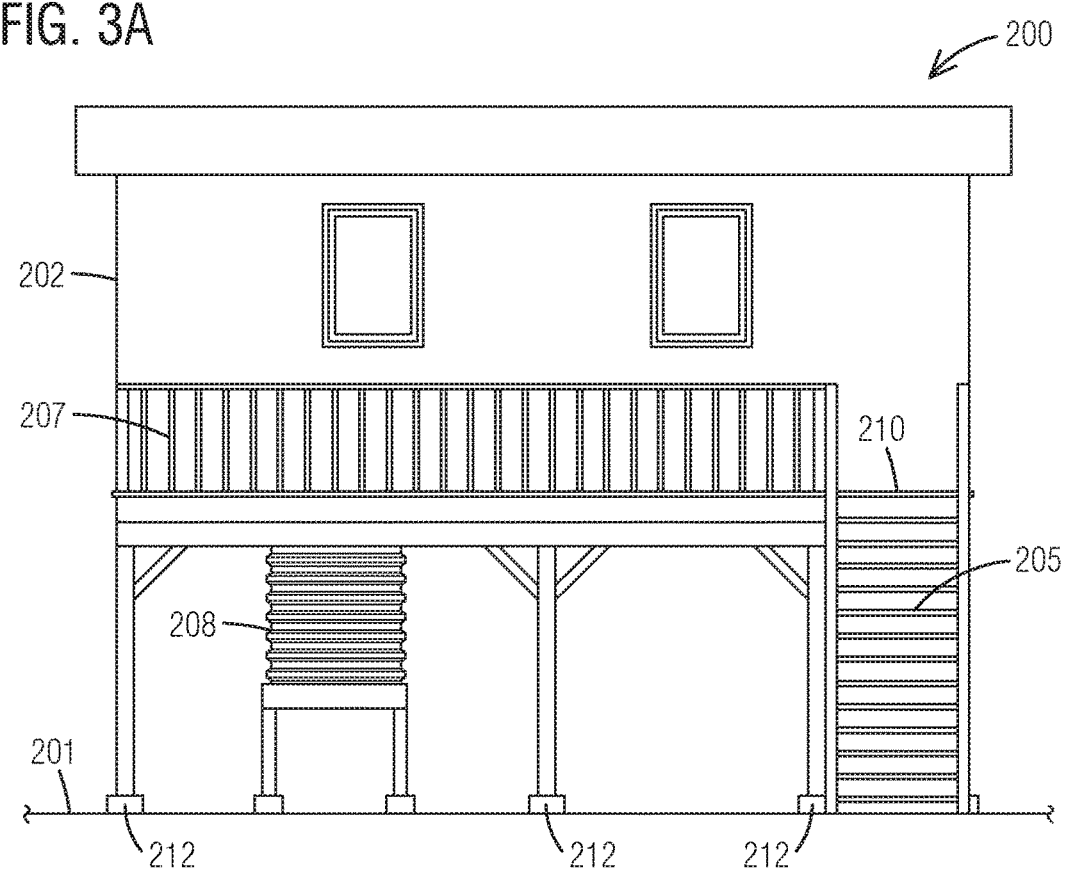
FIG. 3A is an image that illustrates an example of a front view of a system for emergency egress training, according to an embodiment.
Figure 3B:
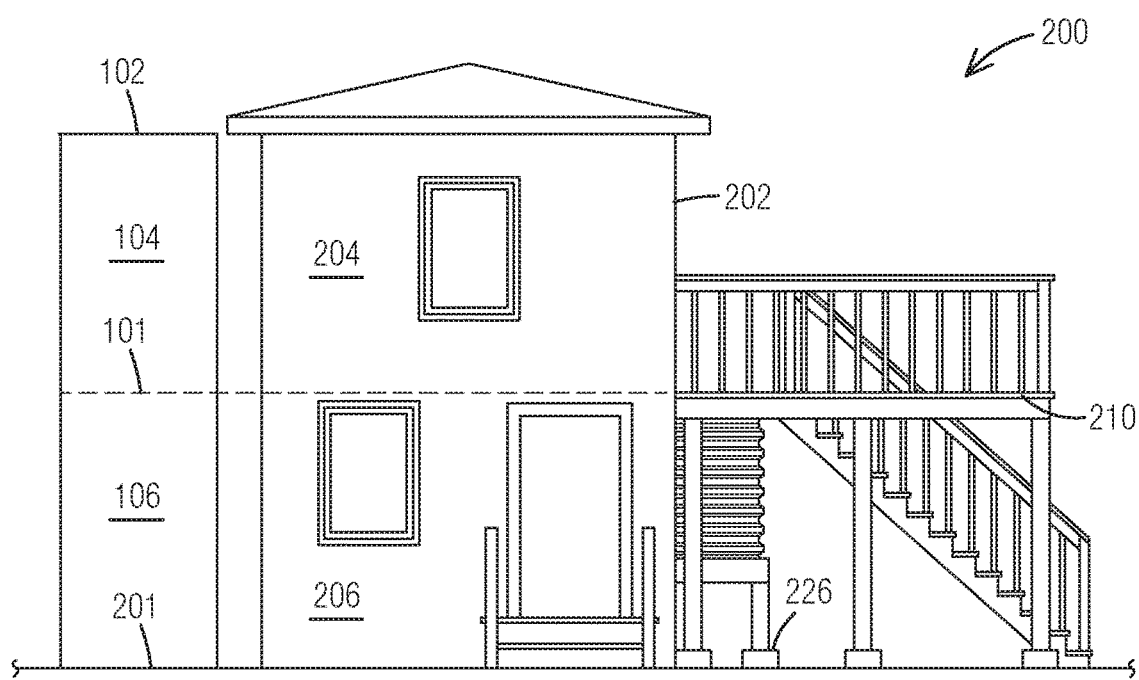
FIG. 3B is an image that illustrates an example of a side view of the system of FIG. 3A, according to an embodiment.
Figure 3C:
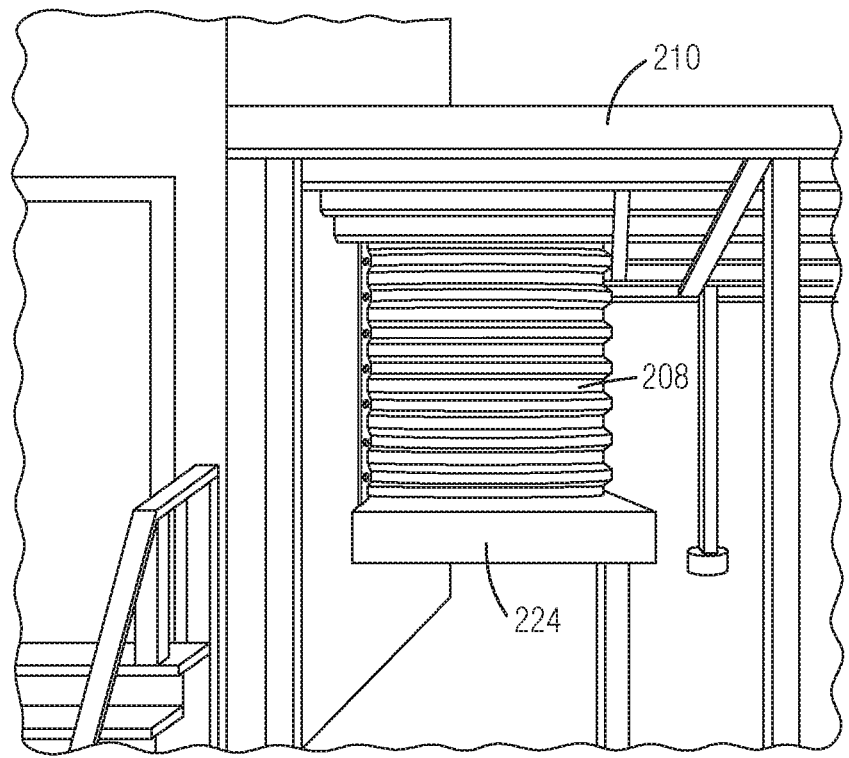
FIG. 3C is an image that illustrates an example of a side view of the platform and egress well of the system of FIG. 3A, according to an embodiment.

In an embodiment, the system 200 includes a training building 202 mounted to a ground surface 201 and including a first story 206 and a second story 204. In some embodiments, the training building 202 is a burn building. In other embodiments, the training building 202 is a non-burn building. Although FIGS. 2A-2D and/or FIGS. 3A-3B depict that the training building 202 has two stories, in other embodiments the training building 202 can have more than two stories. In one embodiment, the first story 206 simulates the basement 106 of the conventional building 102 and the second story 204 simulates the first story 104 of the conventional building 102, as depicted in the side-by-side comparison of the buildings 102, 202 in FIG. 3B. In an example embodiment, the first story 206 is configured to have one or more parameters (e.g. height) based on corresponding parameters (e.g. height) of the basement 106 and/or the second story 204 is configured to have one or more parameters (e.g. height) based on corresponding parameters (e.g. height) of the first story 104. In some embodiments, the system 200 excludes the training building 202. In another embodiment, the training building 202 (e.g. non-burn building) is made from wood material such as and advantageously need not conform to building code required for buildings used for residences and/or to transact business. In still other embodiments, the training building 202 is a burn building and is made from material such as concrete, aluminum or any other material used to make burn buildings, as appreciated by one skilled in the art.

Figure 2E:
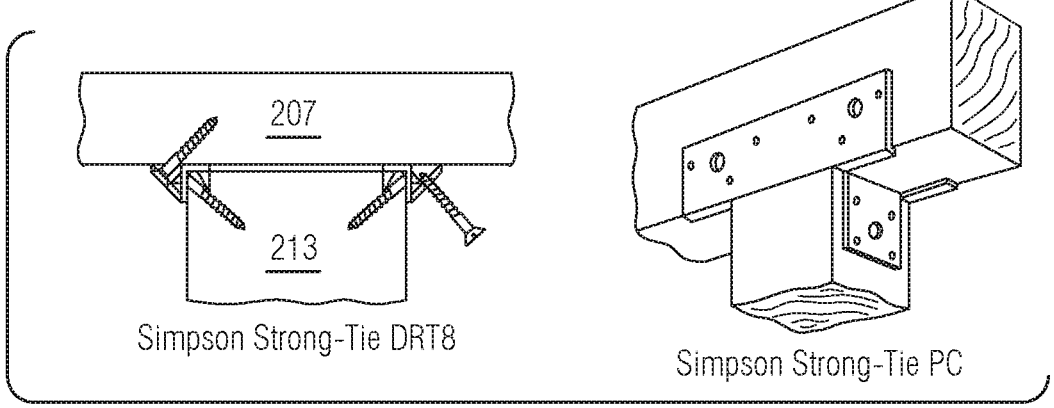
FIG. 2E depicts schematic drawings that illustrate an example of sectional and perspective views of a railing of the platform secured to posts of the platform of the system of FIG. 2A, according to an embodiment.
Figure 2F:
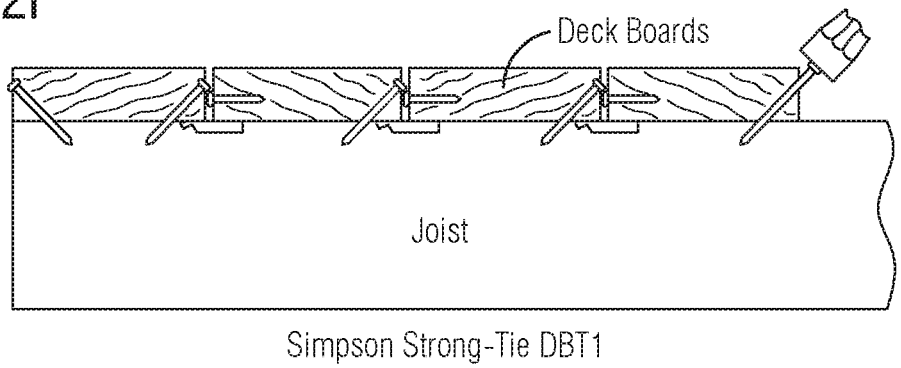
FIG. 2F is a schematic drawing that illustrates an example of a sectional view of deck boards of the platform secured to a joist of the system of FIG. 2A, according to an embodiment.
Figure 2G:
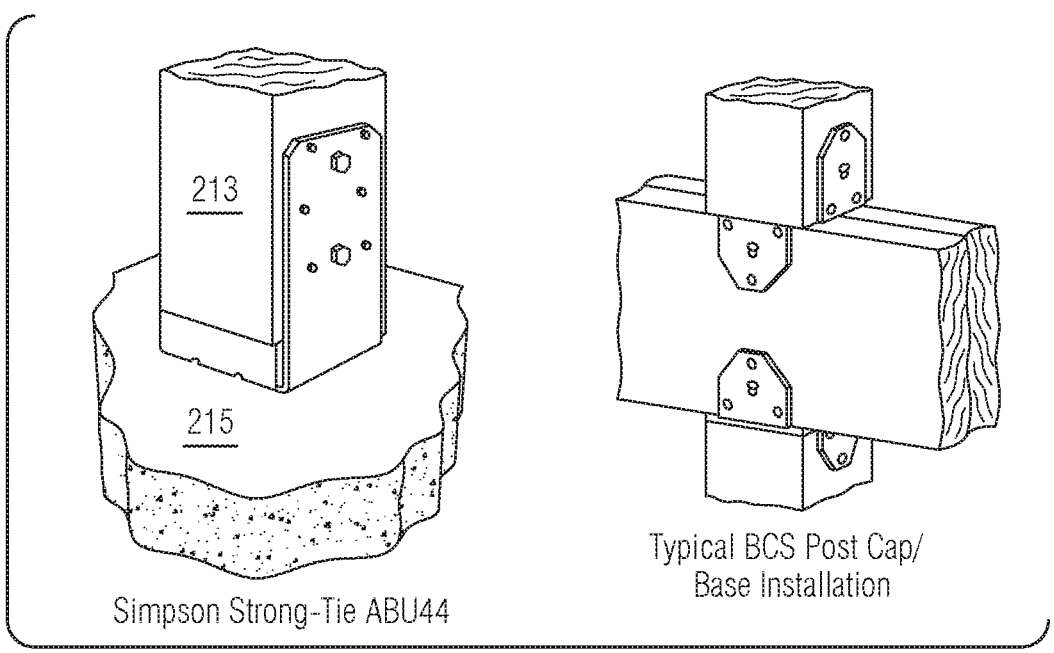
FIG. 2G is a schematic diagram that illustrates an example of a perspective view of a post of the platform base secured to concrete blocks of the system of FIG. 2A, according to an embodiment.

In an embodiment, the system 200 further includes a platform 210 with a base 212 that mounts the platform 210 to the ground surface 201. In an example embodiment, the base 212 includes a plurality of posts 213 positioned around a perimeter and/or interior of the platform 210, where each post is mounted to the ground surface 201 (e.g. the end of each post is secured to a concrete block 215 secured in the ground surface 201). In another embodiment, the platform 210 includes railing 207 that extends along one or more sides of the platform 210 and does not extend along one side 209 (FIG. 3H) that adjoins the training building 202. In yet another embodiment, the platform 210 includes stairs 205 to ascend from the ground surface 201 to the platform 210. Although the railing 207 and stairs 205 are depicted in FIGS. 3A-3B, in other embodiments, the railing 207 and stairs 205 are excluded. As depicted in FIG. 2E, in some embodiments, a top of each post 213 is mounted to the railing 207 by securing a Simpson strong tie to the post 213 and subsequently passing one or more fasteners at an angle through the Simpson strong tie and into the railing 207. As depicted in FIG. 2G, in one example embodiment, the base of each post 213 is mounted to the block 215 using a Simpson strong tie.

As depicted in FIG. 3B, in one embodiment the platform 210 is aligned between the first story 206 and the second story 204 of the training building 202 and/or between the first story 104 and basement 106 of the conventional building 102 and thus the platform 210 simulates the ground surface 101 on which the conventional building 102 is mounted.

In an embodiment, the system 200 includes an egress well 208 operatively connected to the platform 210 at an opening 211 (FIGS. 3H-3O) in the platform 210 so that a base of the egress well 208 is positioned above the ground surface 201. In an embodiment, the egress well 208 is made from steel or fiberglass material. In another embodiment, the egress well 208 is coated (e.g. sprayed) with a material (e.g. LINE-X® provided by Line-X Corporation of Huntsville, Alabama) to enhance a durability and to protect the material of the egress well 208 from damage (e.g. punctures from tools from firemen they may inadvertently drop during use of the system 200). In one embodiment, the base of the egress well 208 is a well platform 224 (FIG. 3D) which is positioned above the ground surface 201 and is supported above the ground surface 201 by a well support 226 (FIG. 3B). In an example embodiment, the well support 226 includes a plurality of posts (e.g. shorter than the posts of the platform base 212) that are mounted to the ground surface 201.

Figure 3D:
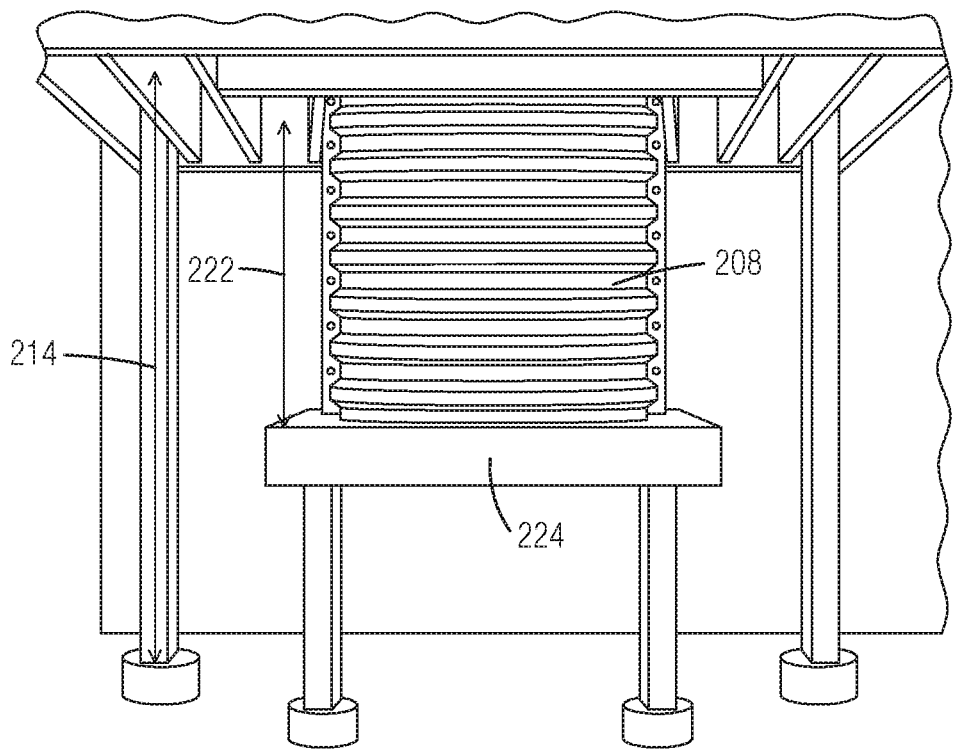
FIG. 3D is an image that illustrates an example of a front view of the egress well of the system of FIG. 3A, according to an embodiment.

As depicted in FIG. 3D, in one embodiment a platform height 214 defined between the platform 210 and the ground surface 201 is about 9 feet or in a range from about 7 feet to about 11 feet and/or in a range from about 5 feet to about 13 feet. In another embodiment a well height 222 defined between the top of the egress well 208 engaging the opening 211 of the platform 210 (FIGS. 3H-3O) and the well platform 224 is about 3 feet or in a range from about 2 feet to about 5 feet. In an embodiment, the well height 222 is not greater than the platform height 214.

Figure 3E:
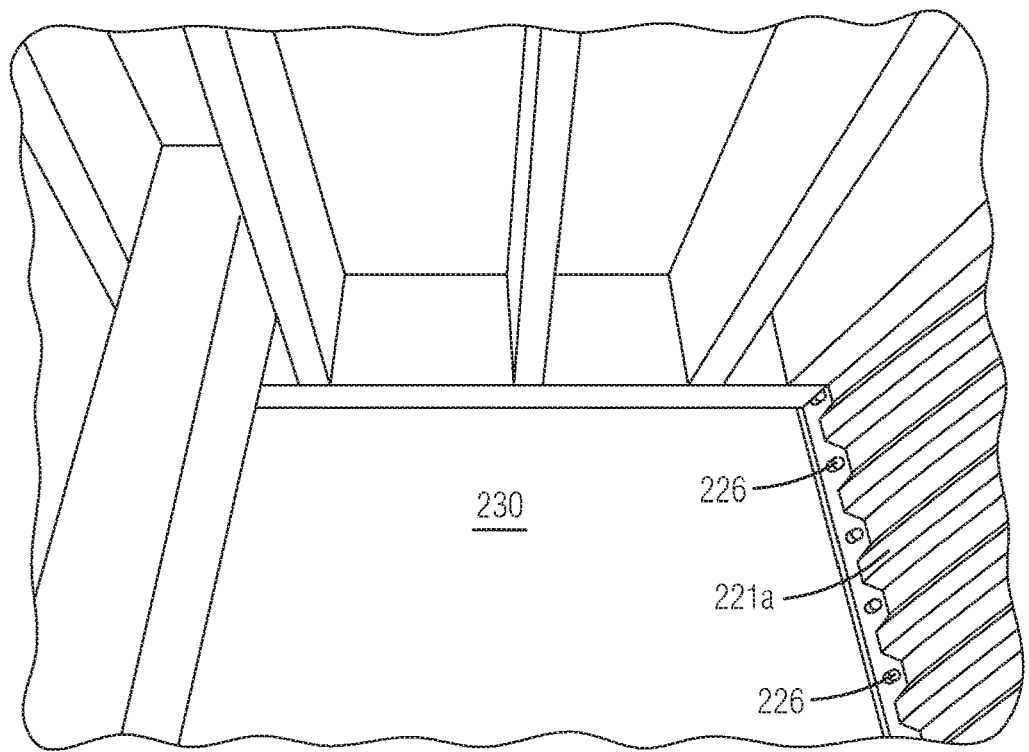
FIG. 3E is an image that illustrates an example of a front perspective view of the egress well connected to the training building in the system of FIG. 3A, according to an embodiment.
Figure 3F:
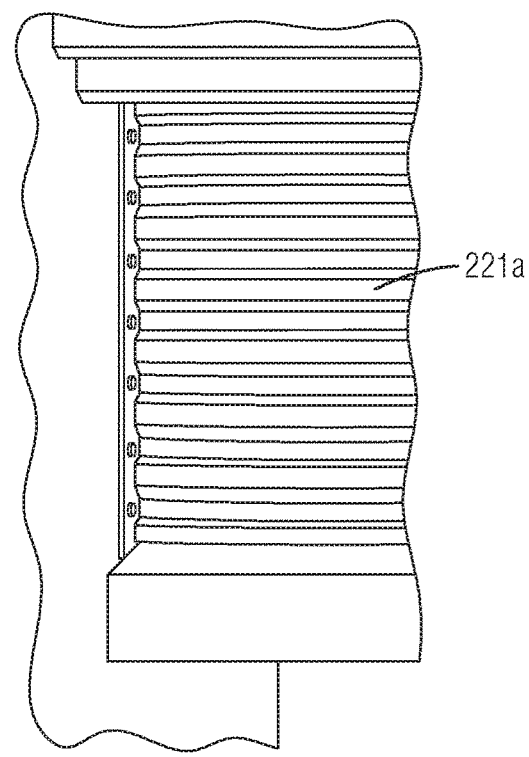
FIG. 3F is an image that illustrates an example of a side view of the egress well connected to the training building in the system of FIG. 3C, according to an embodiment.

In an embodiment, the egress well 208 is operatively connected to the training building 202. In one embodiment, the egress well 208 is operatively connected to the first story 206 of the training building 202. FIGS. 3E-3F are images that illustrate an example of respective front and side views of the egress well 208 connected to the training building 202 in the system 200 of FIG. 3A, according to an embodiment. In one embodiment, the egress well 208 is operatively connected to a side 230 of the training building 202, e.g. the side 230 of the training building 202 adjoining the platform 210. In one example embodiment, the egress well 208 includes a first well side 221a and a second well side 221b and an intermediate portion 223 therebetween (FIG. 3M). In one example embodiment, the first well side 221a includes one or more openings along a length of the first well side 221a and one or more fasteners 226 are passed through the one or more openings and into the side 230 of the training building 202 to secure the first well side 221a to the training building 202. In an embodiment, a similar arrangement is provided to secure the second well side 221b to the training building 202. Although this embodiment discusses the use of fasteners 226 to secure the egress well 208 to the training building 202, in other embodiments other methods or means can be used to secure the egress well 208 to the training building 202 appreciated by one of ordinary skill in the art, e.g. adhesives, welding, etc.

Figure 3G:
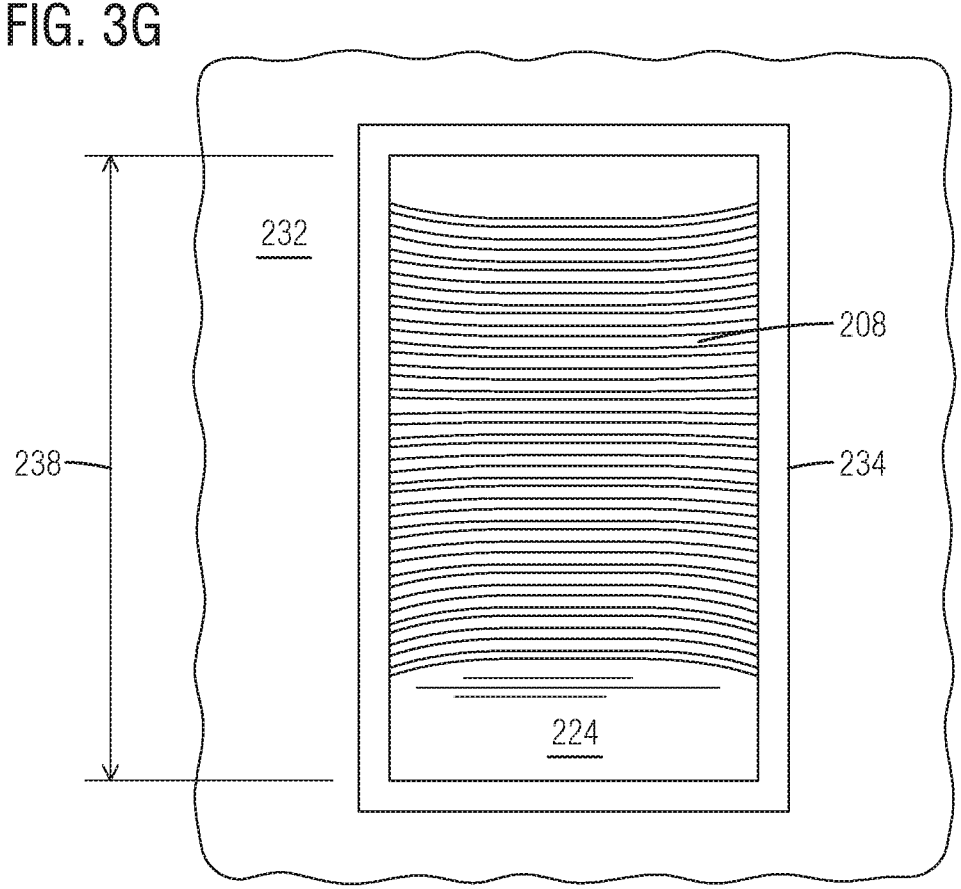
FIG. 3G is an image that illustrates an example of a plan view of a window and egress well from within the training building of the system of FIG. 3A, according to an embodiment.
Figure 3H:
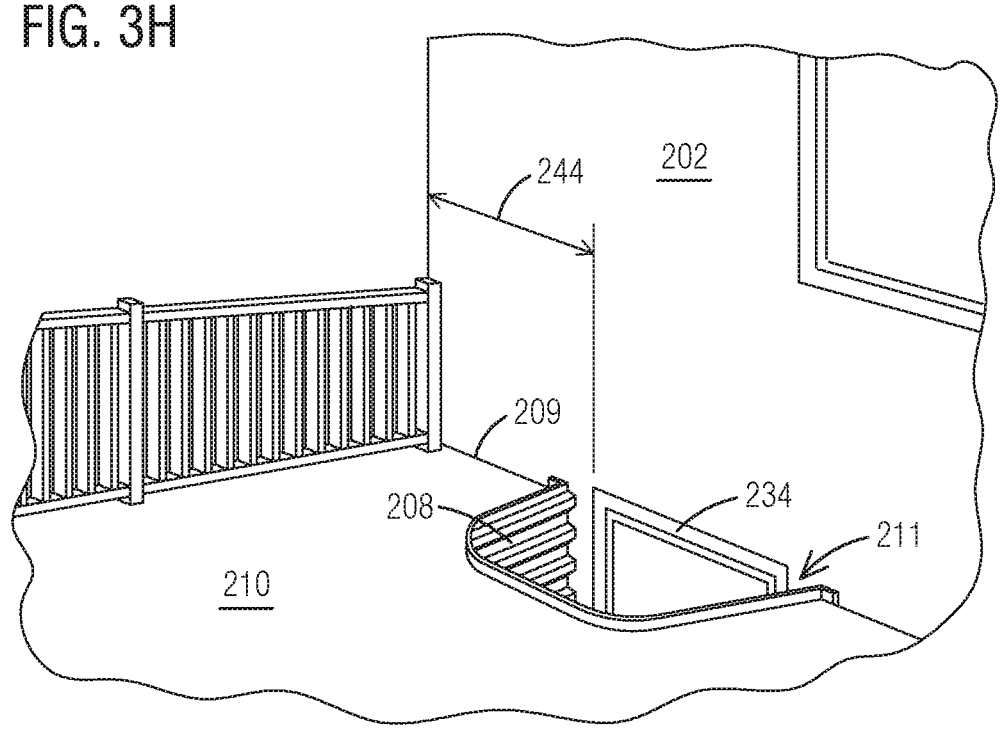
FIGS. 3H-3K are images that illustrate an example of views of an egress well connected to an opening in the platform of the system of FIG. 3A, according to an embodiment.

FIG. 3G is an image that illustrates an example of a plan view of a window 234 in the first story 206 of the training building 202 and the egress well 208, as viewed from within the training building 202 of the system 200 of FIG. 3A, according to an embodiment. In an embodiment, the interior surface 232 of the training building 202 defines the window 234 on the first story 206 of the training building 202. In one embodiment, a height 238 of the window 234 is used to adjust the well height 222. In an example embodiment, the well height 222 is sized to be within a minimum threshold (e.g. within one of ±5%, ±10% or ±20%) of the window height 238. In yet another embodiment, a top of the window 234 is used to adjust the platform height 214. In an example embodiment, the platform height 214 is sized so that the platform 210 is aligned within a minimum threshold (e.g. one of ±6 inches, ±12 inches or ±2 feet) of the top of the window 234. In one embodiment, FIG. 3G depicts an interior surface of the egress well 208 and the well platform 224 that can be viewed through the window 234 from within the training building 202. In other embodiments, the window 234 has dimensions other than what is depicted in FIG. 3G.

FIGS. 3H-3K are images that illustrate an example of views of the opening 211 in the platform 210 of the system 200 of FIG. 3A, according to an embodiment. In an embodiment, the platform 210 defines the opening 211 along an edge of one side 209 of the platform 210 that adjoins the training building 202. In one embodiment, the side 209 of the platform 210 is the side of platform that excludes railing 207. In an example embodiment, the side 209 of the platform 210 has a length that is equal to or less than the length of the side of the training building 202. In an example embodiment, the length of the side 209 of the platform 210 is about 20 feet or in a range from about 15 feet to about 25 feet and/or from about 10 feet to about 30 feet. In another embodiment, the edge of the side 209 of the platform adjoins the training building 202 along a top of the window 234 and/or between the first story 206 and second story 204 of the training building 202 and/or between the basement 106 and the first story 104 of the conventional building 102 so that the platform 210 simulates the ground surface 101 on which the conventional building 102 is mounted (FIG. 3B).

In an embodiment, the platform 210 defines the opening 211 along the edge of the side 209 at a location so that the opening 211 is aligned with the window 234 in the first story 206 of the training building 202. In an example embodiment, the opening 211 is defined along the side 209 at a location that is based on a window separation 244 (FIG. 3H) of a first edge of the window 234 from an edge of the side 230 of the training building 202 and is further based on a width of the window 234 along the side 230 of the training building 202.

As depicted in FIGS. 3H-3K, in one embodiment the opening 211 has a width that is larger than a width of the window 234 (e.g. about 5% and/or about 10% and/or about 20% larger). In an example embodiment, the width of the window 234 is about 4'4" or in a range from about 3' to about 5'. In an example embodiment, the platform 210 defines the opening 211 so that the opening 211 is unobstructed (e.g. not covered with a fixed or removable cover). In another example embodiment, as depicted in FIG. 3P the opening 211 is covered with a cover 250 (e.g. removable). In some embodiments, the opening 211 is covered with the cover, in order to bring the training building 202 to building code compliance.

Figure 3I:
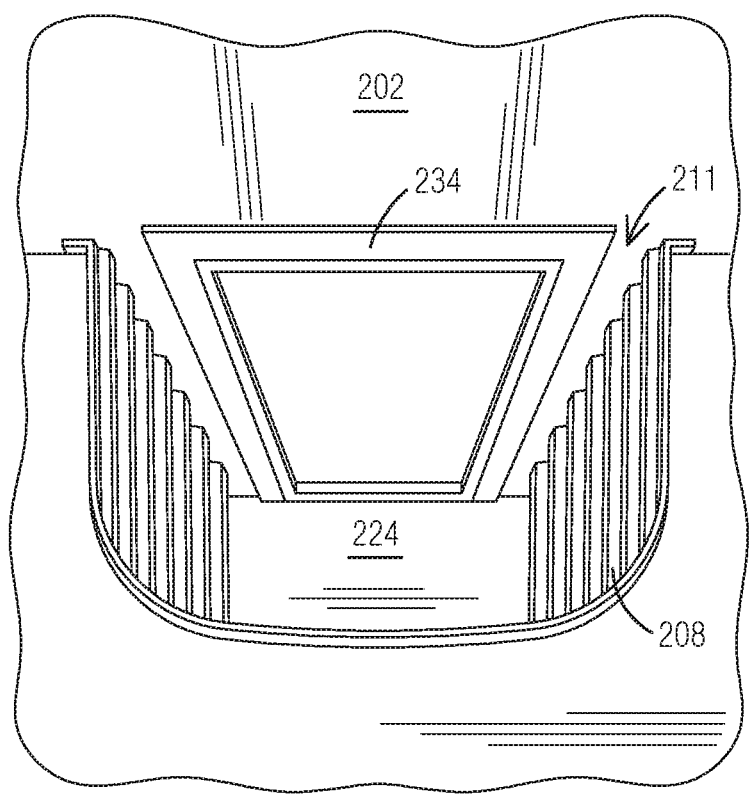
Figure 3J:
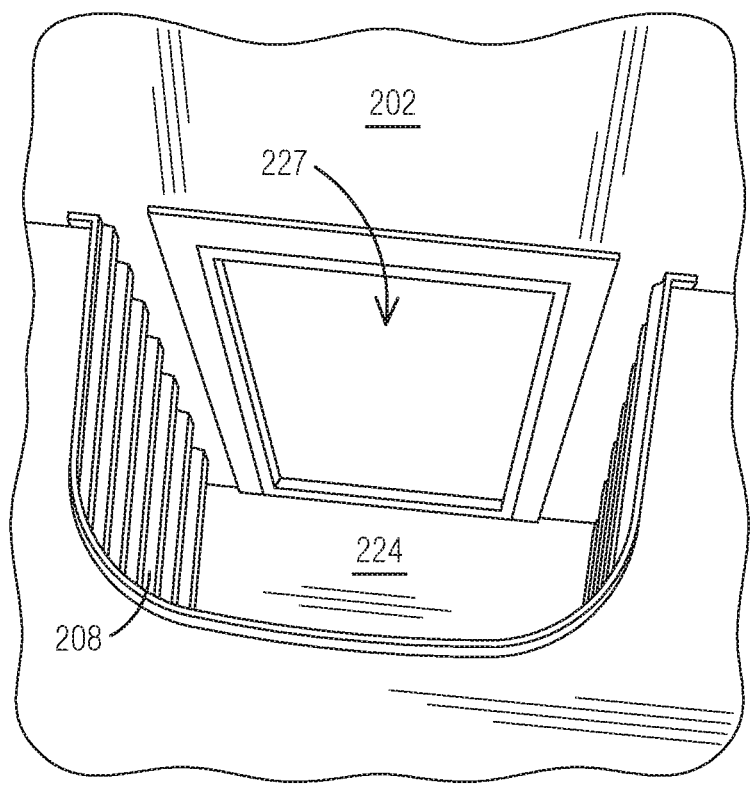
Figure 3K:
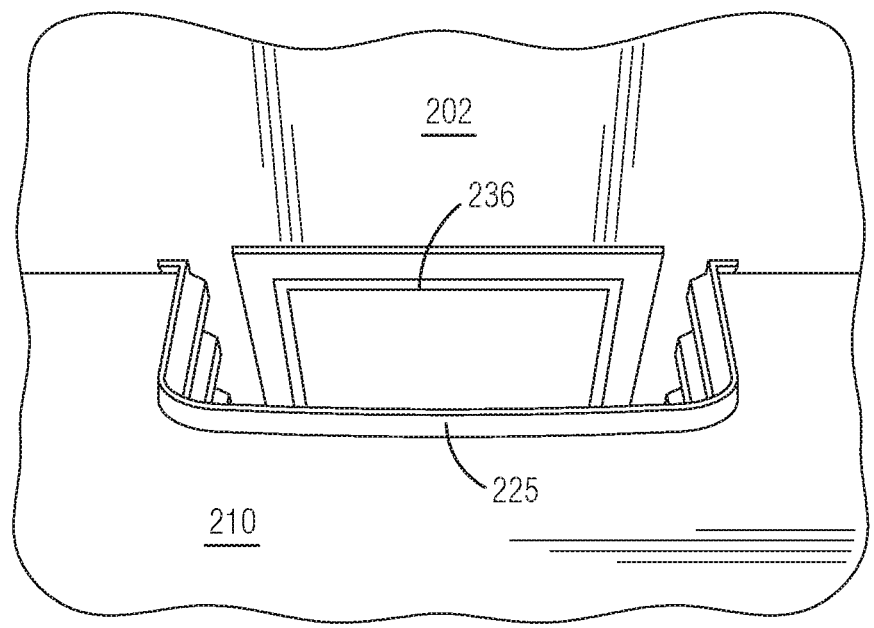

In an embodiment, as depicted in FIG. 3I, the platform 210 includes an arcuate surface at the opening 211 and the egress well 208 operatively connected to the platform 210 at the opening 211 includes an arcuate surface based on the arcuate surface of the platform 210 at the opening 211. In an example embodiment, the arcuate surface of the platform 210 defines a U-shaped opening 211 and the arcuate surface of the egress well 208 defines a U-shaped egress well 208 that includes a first well side 221a and second well side 221b (FIG. 3M) with an intermediate portion 223 between the first and second well sides 221a, 221b. In this example embodiment, the first and second well sides 221a, 221b of the U-shaped egress well 208 are operatively connected to the training building 202 (e.g. with fasteners 226 as shown in FIG. 3E) and the intermediate portion 223 is positioned opposite from the training building 202.

In another example embodiment, the training building 202 and the egress well 208 defines an egress cavity 227 (FIG. 3J) in which a trainee using the system 200 exits the window 234 and subsequently exits the egress well 208 onto the ground surface 201. As depicted in FIG. 3M, a width 240 of the egress cavity 227 along the training building 202 is about 56 inches or in a range from about 40 inches to about 70 inches and a depth 242 of the egress cavity 227 orthogonal to the training building 202 is about 36 inches or in a range from about 25 inches to about 45 inches. In another embodiment, the egress well 208 is sized so that the egress cavity 227 has a minimum area (e.g. 9 square feet), to conform with egress compliance code. Although FIG. 3M depicts the opening 211 and egress well 208 with arcuate surfaces (e.g. U-shaped surfaces), the opening 211 and egress well 208 are not limited to this shape and in some embodiments may feature one or more non-arcuate and/or straight surfaces (e.g. so that the egress well 208 and training building 202 form the egress cavity 227 with a cross-section that takes any polygon shape such as rectangular or square, etc.).

In an embodiment, a top of the egress well 208 is operatively connected to the platform 210. In one embodiment, the top of the egress well 208 includes an outward lip 225 (FIGS. 3K and 3N) that extends radially outward from the top of the egress well 208 and engages the platform 210 adjacent to the opening 211. In an example embodiment, one or more parameters of the outward lip 225 are sized such that the outward lip 225 is capable of supporting the egress well 208 on the platform 210 and prevent the egress well 208 from disengaging the support 210 during use of the training system 200. In an example embodiment, the parameter is a radial extension of the outward lip 225 from the top of the egress well 208 outward along the platform 210 and is about 3" or in a range from about 0.5" to about 6".

Figure 3L:
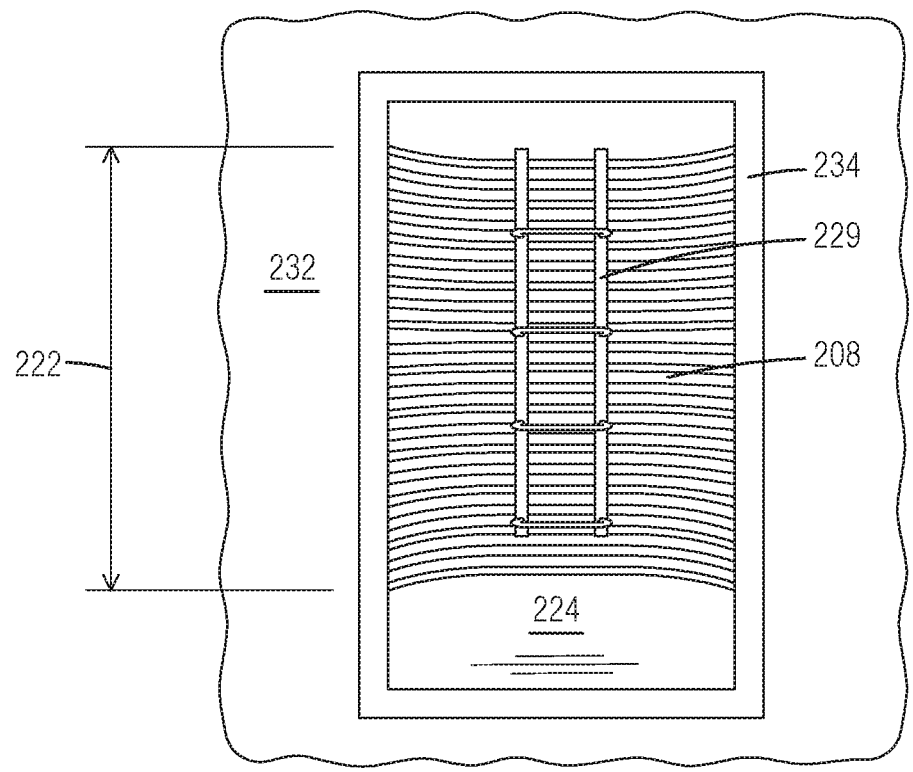
FIGS. 3L-3M are images that illustrate an example of views of a ladder mounted to an inside surface of the egress well of the system of FIG. 3A, according to an embodiment.
Figure 3M:
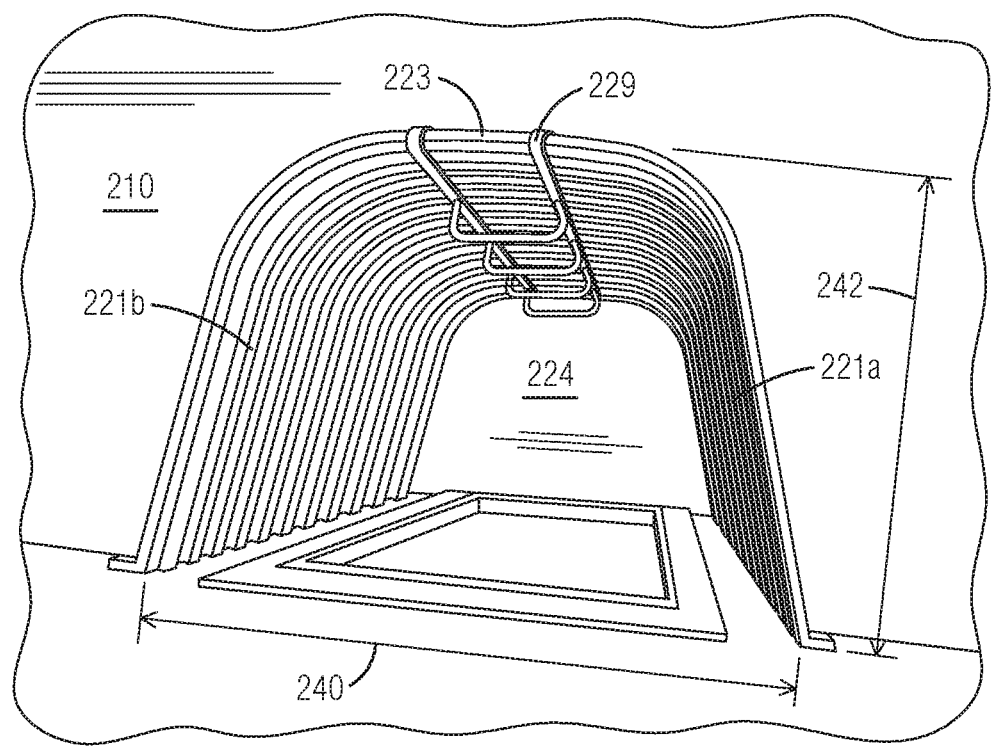
Figure 3N:
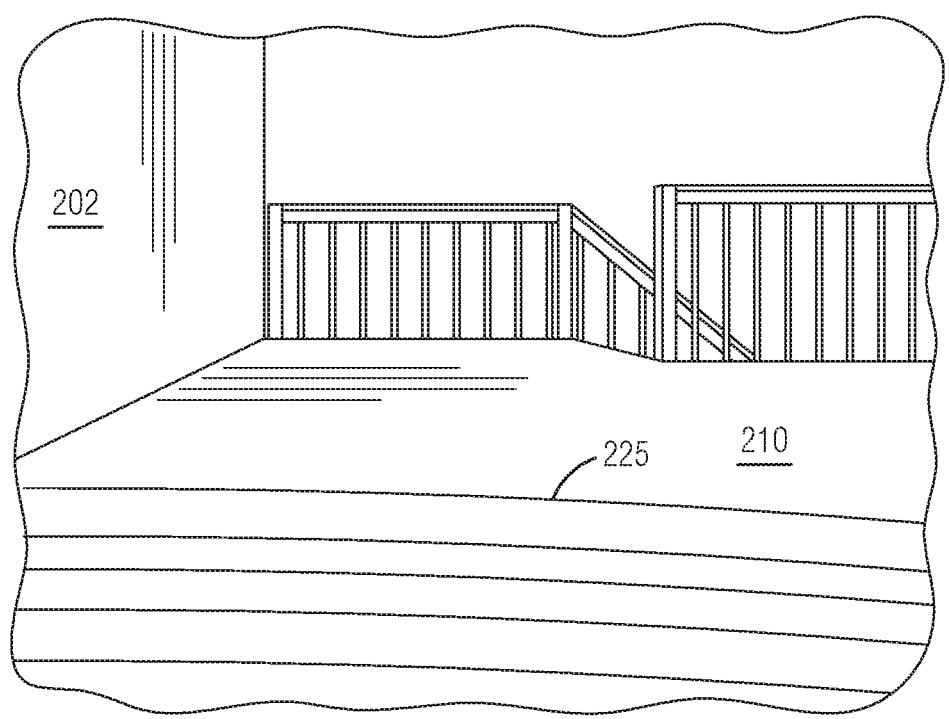
FIGS. 3N-3P are images that illustrate an example of views from within the egress well of the system of FIG. 3A, according to an embodiment.
Figure 3O:
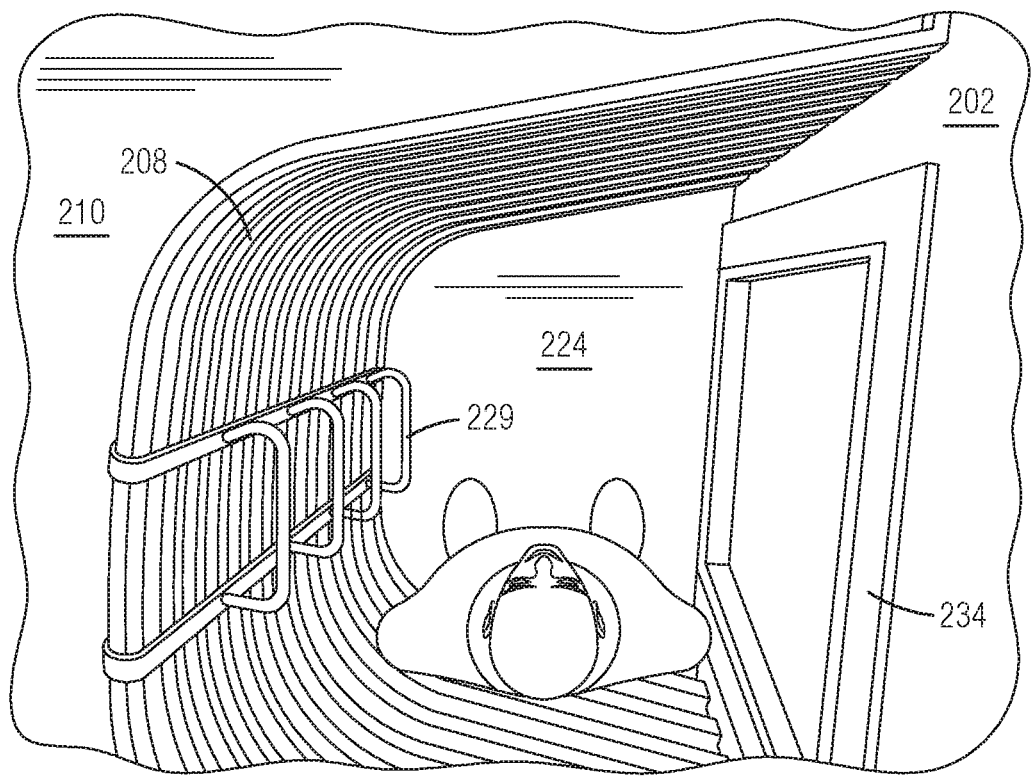
Figure 3P:
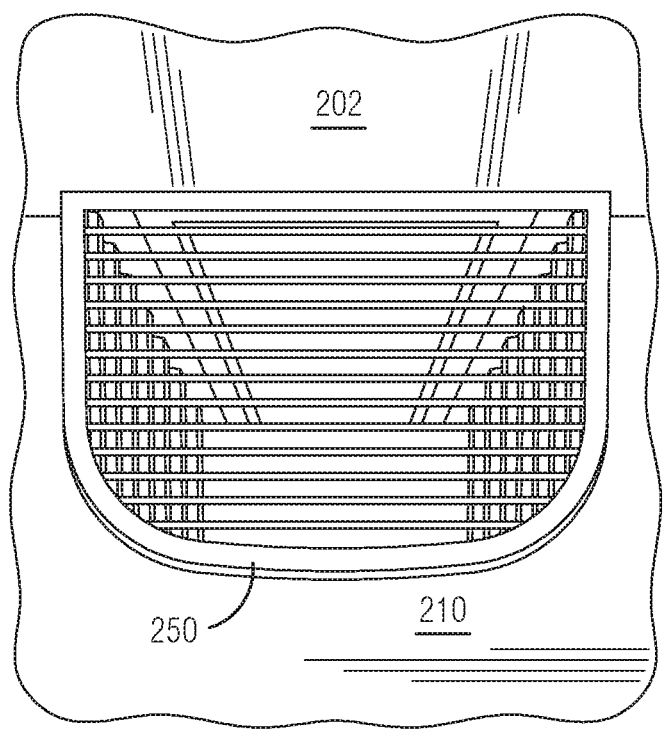

FIGS. 3L-3M are images that illustrate an example of views of a ladder 229 mounted to an inside surface of the egress well 208 of the system 200 of FIG. 3A, according to an embodiment. In an embodiment, the ladder 229 is mounted to an inside surface of the intermediate portion 223 that is positioned opposite from the first story 206 of the training building 202. In an example embodiment, the ladder 229 is mounted along the inside surface of the intermediate portion 223 and a top of the ladder 229 includes a hook attachment that extends around the top of the egress well 208 and engages the platform 210 so that the platform 210 supports the ladder 229 when one or more trainees (e.g. firefighter trainees) are climbing out of the egress well 208 using the ladder 229. In this embodiment, the ladder 229 is removably mounted to the inside surface of the egress well 208 since the ladder 229 can be easily removed from the egress well 208 (e.g. by hooking the ladder 229 from over the top of the egress well 208). However, in other embodiments, the ladder 229 can be permanently mounted to the inside surface of the egress well 208. In some embodiments, the ladder 229 is excluded and the trainees climb of the egress well 208 onto the platform 210 using other means such as their own physical effort (e.g. manually climbing out of the egress well 208 onto the platform 210), a rope, or any other means appreciated by one of ordinary skill in the art. Although FIGS. 3L-3M depict the ladder 229 mounted on the inside surface of the intermediate portion 223, in other embodiments the ladder 229 can be mounted on the inside surface of any portion of the egress well 208 such as the first side 221a or second side 221b of the egress well 208. In still other embodiments, although FIGS. 3L-3M depict one ladder 229 mounted on the inside surface of the egress well 208, in other embodiments more than one ladder can be mounted on the insider surface of the egress well 208 at different locations (e.g. at the two sides 221a, 221b of the egress well 208).

As depicted in FIG. 4, a flowchart is depicted that provides an emergency egress training method 400. Although the flowchart of FIG. 4 depicts particular steps in a particular order, in some embodiments the steps may be arranged in a different order and/or one or more steps may be omitted and/or additional steps may be included.

In an embodiment, in step 401 the training building 202 is provided and mounted to the ground surface 201. In one embodiment, in step 401 the training building 202 is provided by forming the first story 206 and second story 204 with one or more parameter (e.g. height) based on one or more parameters (e.g. height) of the basement 106 and/or first story 104 of the conventional building 102. In another embodiment, in step 401 the training building 202 is mounted to the ground surface 201 using one or more conventional mounting techniques appreciated by one of ordinary skill in the art.

In an embodiment, in step 402 the platform 210 is provided that defines the opening 211 and includes the base 212. In one embodiment, in step 402 the platform 210 includes the railing 207 that extends around one or more sides of the platform 210 excluding the side 209 adjoining the training building 202. In another embodiment, in step 402 the platform 210 includes the stairs 205 to provide access to the platform 210 from the ground surface 201. In another embodiment, in step 402 the platform 210 is shaped so that the opening 211 is positioned along an edge of the side 209 of the platform 210 at a location so that the opening 211 is aligned with the window 234 in step 404.

In an embodiment, in step 404 the platform 210 is mounted to the ground surface 201. In one embodiment, in step 404 the platform 210 is mounted to the ground surface 201 with the base 212. In one embodiment, in step 404 one or more posts of the base 212 engage one or more respective concrete blocks securely mounted to the ground surface 201. In another embodiment, in step 404 the platform 210 is aligned within a minimum threshold (e.g. ±6 inches or ±12 inches or ±2 feet) of the top of the window 234. In yet another embodiment, in step 404 the platform 210 is aligned between the first story 206 and second story 204 of the training building 202.

In an embodiment, in step 406 the egress well 208 is operatively connected to the platform 210 at the opening 211. In one embodiment in step 406 the top of the egress well 208 engages the platform 210 at the opening 211. In another embodiment, in step 406 the outward lip 225 at the top of the egress well 208 extends radially outward from the egress well 208 and engages the platform 210.

In an embodiment, in step 408 the egress well 208 is operatively connected to the training building 202. In one embodiment in step 408 one or more fasteners 226 are passed through one or more openings in the egress well 208 and into the training building 202 to secure the egress well 208 to the training building 202. In another example embodiment, in step 408 the fasteners 226 are passed through openings in the first side 221a of the egress well 208 and the second side 221b of the egress well 208 to secure the first side 221a and second side 221b of the egress well 208 to the training building 202.

In an embodiment, in step 410 the system 200 is utilized for emergency egress training (e.g. egress training during a fire emergency). In an embodiment, in step 410 one or more trainees (e.g. emergency personnel, police, first responders, current or prospective firefighters, etc.) use the system 200 to prepare for rescuing people from a building (e.g. conventional home 102) with an egress window well (e.g. egress window well 108) in the basement, in the event that people are trapped in the basement (e.g. basement 106) of the building. In an embodiment, in step 410 the trainees begin in the room of the first story 206 with the window 234 (FIG. 3G). In an embodiment, the trainees exit the room through the window 234 and enter the egress cavity 227 on the well platform 224. In an embodiment, when on the well platform 224 the trainees then move from the well platform 224 to the ground surface 201. In one embodiment, the trainees move from the well platform 224 to the ground surface 201 by climbing the ladder 229 mounted to the insider surface of the egress well 208. In other embodiments, such as where the ladder 229 is excluded, the trainees manually climb out of the egress well 208 and onto the ground surface 201. In an example embodiment, the trainees perform step 410 with or without their standard equipment (e.g. standard firefighter equipment). In some embodiments, the trainees perform step 410 without their standard equipment until they are able to repeatedly exit the egress well 208. In this embodiment, after the trainee is able to repeatedly exit the egress well 208 without their standard equipment, the trainee then performs step 410 with their standard equipment.

In still other embodiments, in step 410 the trainees practice removing other individuals from the training building 202 and/or the egress cavity 227. In this embodiment, the method 400 is advantageously replicating the conditions of residents of the conventional building 102 trapped in the building 102 (or a building for a commercial entity, non-profit entity, etc.) during a fire that has engulfs the first floor 104 and the residents (or customers of a building for a commercial entity or participants of a building for a non-profit entity, etc) require assistance in exiting the basement 106 through the egress window well 108. In this embodiment, the trainees practice entering the egress cavity 227 from the ground surface 201, forcing entry (e.g. breaking) through the window 234 and rescuing one or more individuals (e.g. mannequins) from within the training building 202. The trainees then withdraw these individuals to the egress cavity 227 and carry them out of the egress cavity 227 onto the ground surface 201, e.g. by climbing the ladder 229. In still other embodiments, where one or more individuals have exited the window 234 and are in the egress cavity 227, in step 410 one or more trainees assist these individuals out of the egress cavity 227 and onto the ground surface 201. In one example embodiment, the trainees remain on the ground surface 201 and help to pull the individuals up the ladder 229 or up a rope that the trainees set down into the egress cavity 227. In still other embodiments, in step 410 the trainees enter the egress cavity 227 with the individuals and manually assist them (e.g. with the ladder 229 or other means) out of the egress cavity 227 and onto the ground surface 201.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the items, elements or steps modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

What is claimed is:

1. A system for emergency egress training, comprising:
   a platform defining an opening and including a base configured to mount the platform on a ground surface; and
   an egress well operatively connected to the platform at the opening such that a base of the egress well is positioned above the ground surface and wherein the egress well is coupled to a first story of a training building, said training building including the first story simulating a basement of a second building and a second story simulating a first story of the second building.

2. The system of claim 1, wherein the egress well is operatively connected to the first story of the training building and wherein the platform defines the opening along an edge of one side of the platform that is configured to adjoin the training building between the first story and the second story such that the platform simulates a second ground surface on which the second building is mounted.

3. The system of claim 2, wherein the platform defines the opening along the edge of the one side at a location so that the opening is configured to be aligned with a window in the first story of the training building.

4. The system of claim 3, wherein at least one of:
   a height of the egress well, defined between a top of the egress well operatively connected to the opening and the base of the egress well is not greater than a height of the platform defined between the opening and the base of the platform; and the height of the egress well is based on a height of the window in the first story.

5. The system of claim 3, wherein a height of the platform defined between the opening and the base of the platform is sized so that the platform is configured to be aligned with a top of the window.

6. The system of claim 1, wherein the platform defines the opening such that the opening is unobstructed and the platform includes an arcuate surface at the opening and wherein the egress well operatively connected to the platform at the opening comprises an arcuate surface based on the arcuate surface of the platform at the opening.

7. The system of claim 1, wherein a top of the egress well operatively connected to the platform at the opening comprises an outward lip that extends radially outward from the top of the egress well to engage the platform adjacent the opening.

8. The system of claim 1, wherein the egress well is operatively connected to the training building based on one of a fastener and adhesive configured to secure the egress well to the training building.

9. The system of claim 8, wherein the egress well defines one or more openings along a height of the egress well and wherein the egress well is operatively connected to the training building by one or more fasteners passed through the one or more openings and into the training building.

10. The system of claim 8, wherein the egress well has a U-shaped cross section with a first portion and a second portion and an intermediate portion between the first portion and second portion, wherein the one of the fastener and adhesive is configured to secure the first portion and second portion to the training building.

11. The system of claim 1, wherein a height of the egress well is defined by a top of the egress well operatively connected to the platform at the opening and the base of the egress well defined by a well platform positioned between the platform and the ground surface, wherein the well platform includes a well support configured to mount the well platform on the ground surface.

12. The system of claim 1, further comprising a ladder removably mounted to an inside surface of the egress well.

13. The system of claim 12, wherein the egress well includes a first portion and a second portion that are operatively connected to the first story of the training building and an intermediate portion positioned opposite from the first story of the training building and positioned between the first portion and the second portion, wherein the ladder is mounted to the inside surface of the intermediate portion.

14. A system for emergency egress training, comprising:
a training building including a first story simulating a basement of a second building and a second story simulating a first story of the second building;
a platform defining an opening and including a base configured to mount the platform on a ground surface; and
an egress well operatively connected to the platform at the opening such that a base of the egress well is positioned above the ground surface and wherein the egress well is further operatively connected to the first story of the training building.

15. The system of claim 14,
wherein the platform defines the opening along an edge of one side of the platform that is configured to adjoin the training building between the first story and the second story such that the platform simulates a second ground surface on which the second building is mounted; and
wherein the first story of the training building defines a window and wherein the platform defines the opening along the edge of the one side of the platform so that the opening is aligned with the window.

16. The system of claim 15,
wherein the platform defines the opening such that the opening is unobstructed; and
wherein a height of the platform defined between the opening and the base of the platform is sized so that the platform is aligned with a top of the window.

17. The system of claim 14, wherein the egress well defines one or more openings and wherein the first story of the training building is aligned with the one or more openings of the egress well such that one or more fasteners are passed through the one or more openings of the egress well and into the training building to secure the egress well to the first story of the training building.

18. An emergency egress training method, comprising:
providing a training building mounted to a ground surface, said training building including a first story to simulate a basement of a second building and a second story to simulate a first story of the second building;
providing a platform defining an opening and including a base;
mounting the platform to the ground surface with the base;
operatively connecting an egress well to the platform at the opening so that a base of the egress well is positioned above the ground surface; and
operatively connecting the egress well to the first story of the training building.

19. The method of claim 18, wherein the mounting the platform comprises aligning the platform with one of a top of a window in the first story of the training building and between the first story and second story of the training building.

20. The method of claim 18, wherein the providing the platform comprises shaping the platform so that the opening is positioned along an edge of one side of the platform and wherein the mounting the platform to the ground surface comprises aligning the opening along the edge of the one side with a window in the first story of the training building.

21. The method of claim 18, wherein at least one of:
the operatively connecting the egress well to the platform at the opening includes engaging the platform with an outward lip at a top of the egress well that extends radially outward from the top of the egress well; and
the operatively connecting the egress well to the training building comprises aligning one or more openings in the egress well with the training building and passing one or more fasteners through the one or more openings in the egress well and into the training building.

* * * * *